United States Patent
Mongillo, Jr. et al.

(10) Patent No.: US 10,480,347 B2
(45) Date of Patent: Nov. 19, 2019

(54) DIVIDED BAFFLE FOR COMPONENTS OF GAS TURBINE ENGINES

(71) Applicant: United Technologies Corporation, Farmington, CT (US)

(72) Inventors: Dominic J. Mongillo, Jr., West Hartford, CT (US); Ricardo Trindade, Mansfield, CT (US); Nicholas M. LoRicco, Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 66 days.

(21) Appl. No.: 15/874,070

(22) Filed: Jan. 18, 2018

(65) Prior Publication Data

US 2019/0218932 A1 Jul. 18, 2019

(51) Int. Cl.
*F01D 9/04* (2006.01)
*F01D 25/08* (2006.01)
*F01D 25/12* (2006.01)

(52) U.S. Cl.
CPC .............. *F01D 25/12* (2013.01); *F01D 9/041* (2013.01); *F05D 2220/32* (2013.01); *F05D 2240/126* (2013.01); *F05D 2260/202* (2013.01)

(58) Field of Classification Search
CPC ... F01D 5/08; F01D 5/18; F01D 5/188; F01D 5/189; F01D 9/041; F01D 9/065; F01D 25/08; F01D 25/12; F05D 2220/32; F05D 2240/126; F05D 2260/202
See application file for complete search history.

(56) References Cited

U.S. PATENT DOCUMENTS

| | | | |
|---|---|---|---|
| 2,873,944 A | 2/1959 | Wiese et al. | |
| 5,207,556 A | 5/1993 | Frederick et al. | |
| 5,762,471 A | 6/1998 | Cunha | |
| 7,497,655 B1 | 3/2009 | Liang | |
| 8,662,844 B2 | 3/2014 | Hada et al. | |
| 9,500,087 B2 | 11/2016 | Davis | |
| 2016/0376897 A1* | 12/2016 | Spangler | F01D 25/12 415/177 |
| 2018/0195397 A1* | 7/2018 | Spangler | F01D 5/187 |
| 2018/0223676 A1* | 8/2018 | Spangler | F01D 5/189 |
| 2018/0306036 A1* | 10/2018 | Spangler | F01D 5/187 |
| 2018/0320531 A1* | 11/2018 | Spangler | F01D 5/147 |

FOREIGN PATENT DOCUMENTS

| | | |
|---|---|---|
| EP | 0182588 A1 | 5/1986 |
| EP | 2706195 A1 | 3/2014 |

OTHER PUBLICATIONS

European Search Report for European Application No. 19152481.8, filed Jan. 18, 2019, dated Jun. 3, 2019, 7 pages.

* cited by examiner

*Primary Examiner* — Igor Kershteyn
(74) *Attorney, Agent, or Firm* — Cantor Colburn LLP

(57) ABSTRACT

Divided baffles for a gas turbine engines are provided. The divided baffles include a baffle body having a first end and a second end, at least one divider located within the baffle body and extending from the first end to the second end arranged to divide an interior of the baffle body into two or more feed cavities, at least one cap arranged at the first end to bound a first feed cavity of the two or more feed cavities, and at least one cap arranged at the second end to bound a second feed cavity of the two or more feed cavities.

20 Claims, 6 Drawing Sheets

DIVIDED BAFFLE FOR COMPONENTS OF GAS TURBINE ENGINES

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Airfoils may incorporate various cooling cavities located adjacent external side walls. Such cooling cavities are subject to both hot material walls (exterior or external) and cold material walls (interior or internal). Although such cavities are designed for cooling portions of airfoil bodies, various cooling flow characteristics can cause hot sections where cooling may not be sufficient. Accordingly, improved means for providing cooling within an airfoil may be desirable.

BRIEF DESCRIPTION

According to some embodiments, divided baffles for gas turbine engines are provided. The divided baffles include a baffle body having a first end and a second end, at least one divider located within the baffle body and extending from the first end to the second end arranged to divide an interior of the baffle body into two or more feed cavities, at least one cap arranged at the first end to bound a first feed cavity of the two or more feed cavities, and at least one cap arranged at the second end to bound a second feed cavity of the two or more feed cavities.

In addition to one or more of the features described herein, or as an alternative, further embodiments of the divided baffles may include that the first feed cavity is defined between the at least one divider and a first portion of the baffle body and the second feed cavity is defined between the at least one divider and a second portion of the baffle body, wherein each of the first portion and the second portion include one or more impingement holes.

In addition to one or more of the features described herein, or as an alternative, further embodiments of the divided baffles may include at least one flow separator located on an external surface of the baffle body, wherein the at least one flow separator is arranged to at least one of position and support the baffle body within an airfoil cavity.

In addition to one or more of the features described herein, or as an alternative, further embodiments of the divided baffles may include that the at least one divider includes a first divider, a second divider, and a third divider. The first feed cavity is defined between a first portion of the baffle body, the first divider, the second divider, and a first cap located at the first end, the second feed cavity is defined between a second portion of the baffle body, the first divider, the third divider, and a second cap located at the second end, and a first feed cavity defined between a third portion of the baffle body, the second divider, the third divider, and a third cap located at the first end.

According to some embodiments, components for gas turbine engines are provided. The components include an airfoil having a leading edge, a trailing edge, a suction side, and a pressure side, wherein an airfoil cavity is formed within the airfoil, wherein the airfoil extends from an inner diameter to an outer diameter and a divided baffle installed within the airfoil cavity. The divided baffle includes a baffle body having a first end and a second end, wherein the first end is located proximate the inner diameter and the second end is located proximate the outer diameter, at least one divider located within the baffle body and extending from the first end to the second end arranged to divide an interior of the baffle body into two or more feed cavities, at least one cap arranged at the first end to bound a first feed cavity of the two or more feed cavities, and at least one cap arranged at the second end to bound a second feed cavity of the two or more feed cavities.

In addition to one or more of the features described herein, or as an alternative, further embodiments of the components may include that the first feed cavity is defined between the at least one divider and a first portion of the baffle body and the second feed cavity is defined between the at least one divider and a second portion of the baffle body, wherein each of the first portion and the second portion include one or more impingement holes.

In addition to one or more of the features described herein, or as an alternative, further embodiments of the components may include at least one flow separator located on an external surface of the baffle body, wherein the at least one flow separator is arranged to at least one of position and support the baffle body within the airfoil cavity.

In addition to one or more of the features described herein, or as an alternative, further embodiments of the components may include that the at least one flow separator is integrally formed with the baffle body.

In addition to one or more of the features described herein, or as an alternative, further embodiments of the components may include that the at least one flow separator is integrally formed with the airfoil.

In addition to one or more of the features described herein, or as an alternative, further embodiments of the components may include that the at least one divider includes a first divider, a second divider, and a third divider. The first feed cavity is defined between a first portion of the baffle body, the first divider, the second divider, and a first cap located at the first end, the second feed cavity is defined between a second portion of the baffle body, the first divider, the third divider, and a second cap located at the second end, and a first feed cavity defined between a third portion of the baffle body, the second divider, the third divider, and a third cap located at the first end.

In addition to one or more of the features described herein, or as an alternative, further embodiments of the components may include that the airfoil cavity is divided into at least two impingement cavities, wherein the impingement cavities are defined between the baffle body and an interior surface of the airfoil that defines the airfoil cavity.

In addition to one or more of the features described herein, or as an alternative, further embodiments of the components may include that the airfoil is a vane of a gas turbine engine.

In addition to one or more of the features described herein, or as an alternative, further embodiments of the components may include that the airfoil cavity is a leading edge cavity of the airfoil.

According to some embodiments, gas turbine engines are provided. The gas turbine engines include an airfoil having a leading edge, a trailing edge, a suction side, and a pressure side, wherein an airfoil cavity is formed within the airfoil, wherein the airfoil extends from an inner diameter to an outer diameter and a divided baffle installed within the airfoil cavity. The divided baffle includes a baffle body having a first end and a second end, wherein the first end is located proximate the inner diameter and the second end is located proximate the outer diameter, at least one divider located within the baffle body and extending from the first end to the second end arranged to divide an interior of the baffle body into two or more feed cavities, at least one cap arranged at the first end to bound a first feed cavity of the two or more feed cavities, and at least one cap arranged at the second end to bound a second feed cavity of the two or more feed cavities.

In addition to one or more of the features described herein, or as an alternative, further embodiments of the gas turbine engines may include that the airfoil is a vane of a gas turbine engine.

In addition to one or more of the features described herein, or as an alternative, further embodiments of the gas turbine engines may include that the airfoil cavity is a leading edge cavity of the airfoil.

In addition to one or more of the features described herein, or as an alternative, further embodiments of the gas turbine engines may include that the airfoil extends between a first platform and a second platform.

In addition to one or more of the features described herein, or as an alternative, further embodiments of the gas turbine engines may include that the first feed cavity is fluidly connected to the first platform and the second feed cavity is fluidly connected to the second platform.

In addition to one or more of the features described herein, or as an alternative, further embodiments of the gas turbine engines may include that the cap at the first end prevents airflow from the second platform from entering the first feed cavity and the cap at the second end prevents airflow from the first platform from entering the second feed cavity.

In addition to one or more of the features described herein, or as an alternative, further embodiments of the gas turbine engines may include that the first feed cavity is supplied with cooling air from an inner diameter of the airfoil and the second feed cavity is supplied with cooling air from an outer diameter of the airfoil such that airflow within the first feed cavity flows in a different direction than airflow within the second feed cavity.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
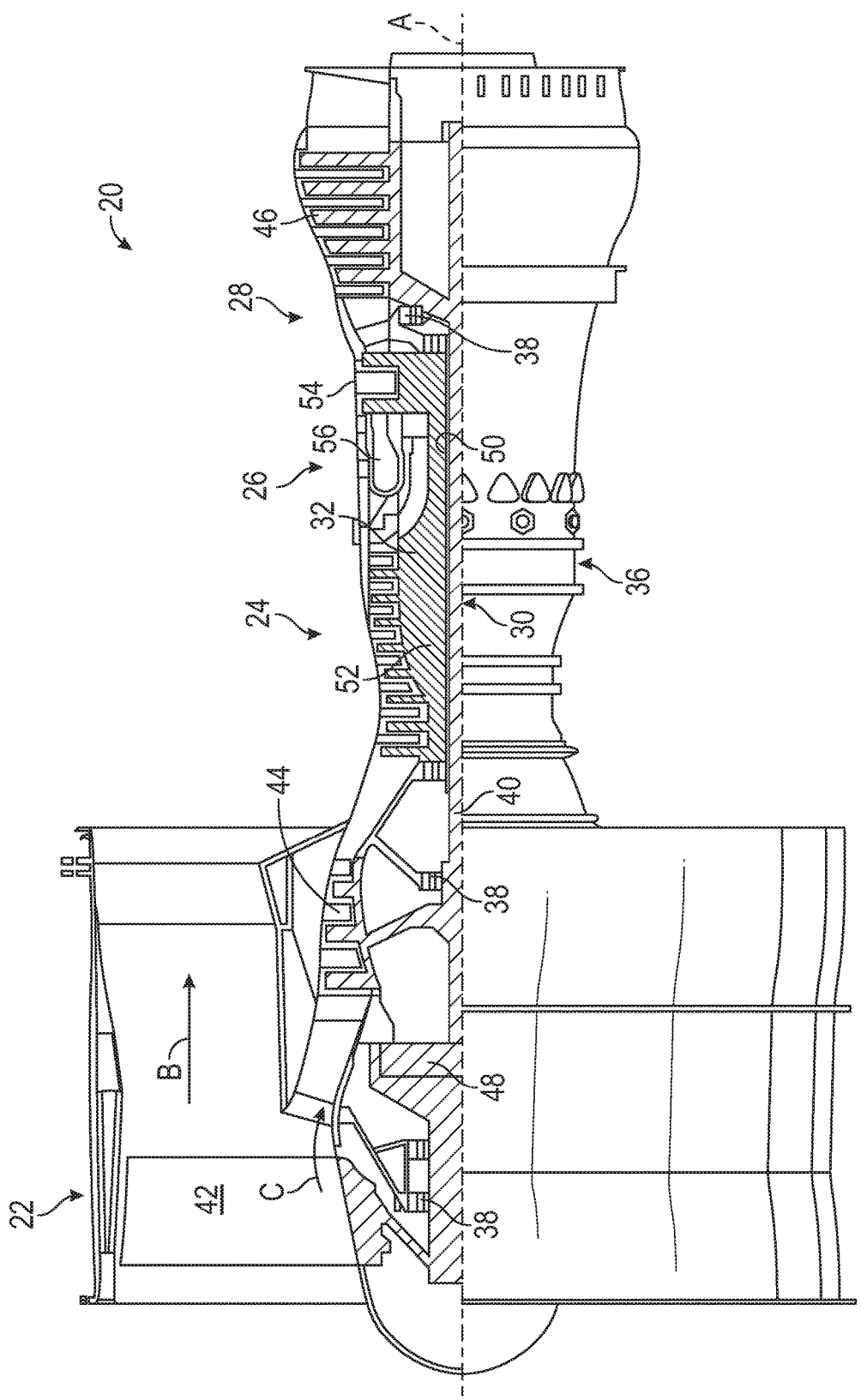
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one non-limiting example is a high-bypass geared aircraft engine. In a further non-limiting example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(514.7°\ R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
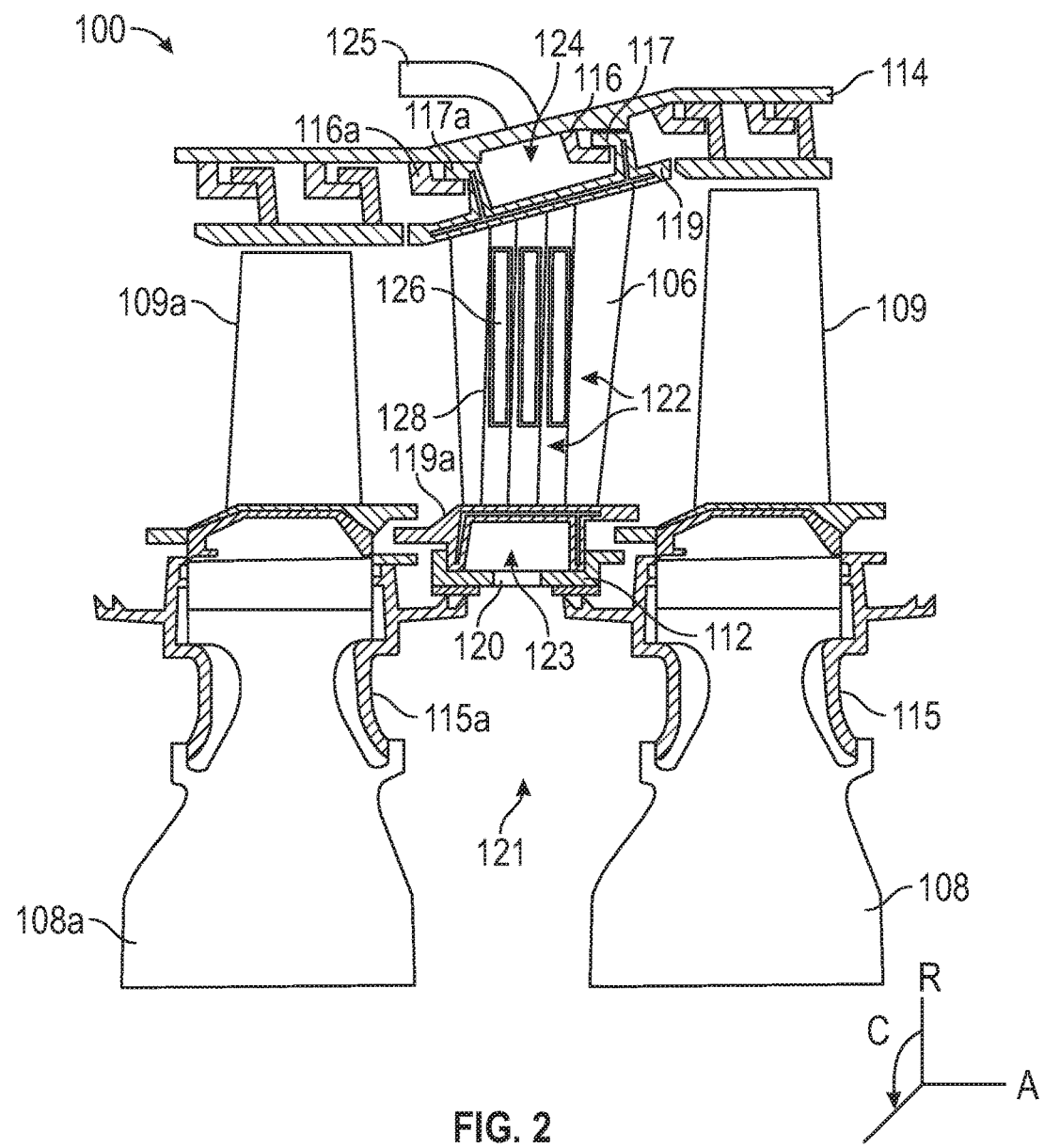
FIG. 2 is a schematic illustration of a portion of a turbine section of the gas turbine engine of FIG. 1.

Referring now to FIG. 2, a cooling design in a turbine section 28 for a gas turbine engine 20 may utilize a vane 106 disposed between axially adjacent bladed full hoop disks 108, 108a having respective blades 109, 109a. As shown, vane 106 is disposed radially between an inner air seal 112 and a full hoop case 114 on an outer side. Inner air seal 112 may be a full hoop structure supported by opposing vanes, including a plurality of vanes 106 that are separated in a circumferential direction. Vane 106 is supported by the full hoop case 114 through segmented vane hooks 117, 117a. One or more full hoop cover plates 115, 115a may minimize leakage between the vane 106 and the blades 109, 109a. The vane 106 is radially supported by the full hoop case 114 with segmented case hooks 116, 116a in mechanical connection with the segmented vane hooks 117, 117a. The vane 106 may be circumferentially supported between circumferentially adjacent platforms 119, 119a which may include feather seals that can minimize leakage between the adjacent vanes 106 into the gas path.

Although FIG. 2 depicts a second stage vane, as appreciated by those of skill in the art, embodiments provided herein can be applicable to first stage vanes as well. Such first stage vanes may have cooling flow supplied to the vane at both the inner and outer diameters, as opposed to the through-flow style cavity which goes from, for example, outer diameter to inner diameter. Thus, the present illustrations are not to be limiting but are rather provided for illustrative and explanatory purposes only.

In the present illustration, a turbine cooling air (TCA) conduit 125 provides cooling air into an outer diameter vane cavity 124 defined in part by an outer platform 119 and the full hoop case 114. The vane 106 is hollow so that air can travel radially into and longitudinally downstream from the outer diameter vane cavity 124, through the vane 106 via one or more vane cavities 122, and into a vane inner diameter cavity 123. The vane inner diameter cavity 123 is defined, in part, by an inner platform 119a. Thereafter air may travel through an orifice 120 in the inner air seal 112 and into a rotor cavity 121. Accordingly, cooling air for at least portions of the vane 106 will flow from a platform region, into the vane, and then out of the vane and into another platform region and/or into a hot gaspath/main gaspath. In some arrangements, the platforms 119, 119a can include ejection holes to enable some or all of the air to be injected into the main gaspath.

It is to be appreciated that the longitudinal orientation of vane 106 is illustrated in a radial direction, but other orientations for vane 106 are within the scope of the disclosure. In such alternate vane orientations, fluid such as cooling air can flow into the vane cavity 122 through an upstream opening illustrated herein as outer diameter cavity 124 and out through a downstream opening in vane cavity 122 illustrated herein as inner diameter cavity 123. A longitudinal span of vane cavity 122 being between such openings.

The vane 106, as shown, includes one or more baffles 126 located within the vane 106. The baffles 126 are positioned within one or more respective baffle cavities 128. The baffle cavities 128 are sub-portions or sub-cavities of the vane cavity 122. In some embodiments, such as shown in FIG. 2, the baffle cavities 128 are internal cavities that are axially inward from the leading and trailing edges of the vane 106, although such arrangement is not to be limiting.

As shown and labeled in FIG. 2, a radial direction R is upward on the page (e.g., radial with respect to an engine axis) and an axial direction A is to the right on the page (e.g., along an engine axis). Thus, radial cooling flows will travel up or down on the page and axial flows will travel left-to-right (or vice versa). A circumferential direction C is a direction into and out of the page about the engine axis.

When supplying cooling air to a first vane of a gas turbine engine, such as the first set of vanes downstream of a combustor, highly effective cooling design configurations that minimize cooling air temperature heat pickup and pressure losses may be more important due to the high temperature air coming out of the combustor and lower operating pressure ratios inherent with first stage vane thermal environment and design operating conditions. For example, air fed from the inner diameter may generally preferred as it may have a lower concentration of dirt or other particulate matter (i.e., the air from the inner diameter may be "clean" or at least cleaner than air from the outer diameter). Supplying clean cooling air to the leading edge and pressure side of the airfoil can be important because dirt may accumulate and plug cooling holes of the airfoil, both internally and externally. Further, due to back flow margin considerations, it may be advantageous to segregate cooling holes of a single internal cavity to be supplied from different cooling sources to either increase and/or reduce pressure losses for given airfoil and inner and/or outer diameter platform regions in order to improve the utilization of cooling airflow by locally tailoring internal pressure loss, in order to achieve desired backside convective and/or film cooling characteristics. As used herein, back flow margin is a ratio between local static pressure of a supply cooling air and local external dump pressure in the gaspath. The ability to segregate and individually tailor local pressure losses, cooling air heat pickup, and cooling air supply sources enables more design flexibility in tailoring local thermal cooling effectiveness requirements to achieve optimal durability capability, increased aerodynamic stage efficiency, as well as improved overall thermodynamic cycle performance of the turbine.

Accordingly, embodiments provided herein are directed to baffle inserts with divided feed passages. The divided feed passages of the baffles enable flow segregation for supplying cooling air to different locations of an airfoil. In some embodiments, the divided feed passage baffles enable a leading edge and a pressure side of an airfoil to be fed from a "clean" inner diameter source, and the suction side may be fed from a relatively "dirtier" outer diameter source. Because the suction side is less susceptible to dirt plugging, the dirtier supply air has less impact on the vane cooling.

Figure 3A:
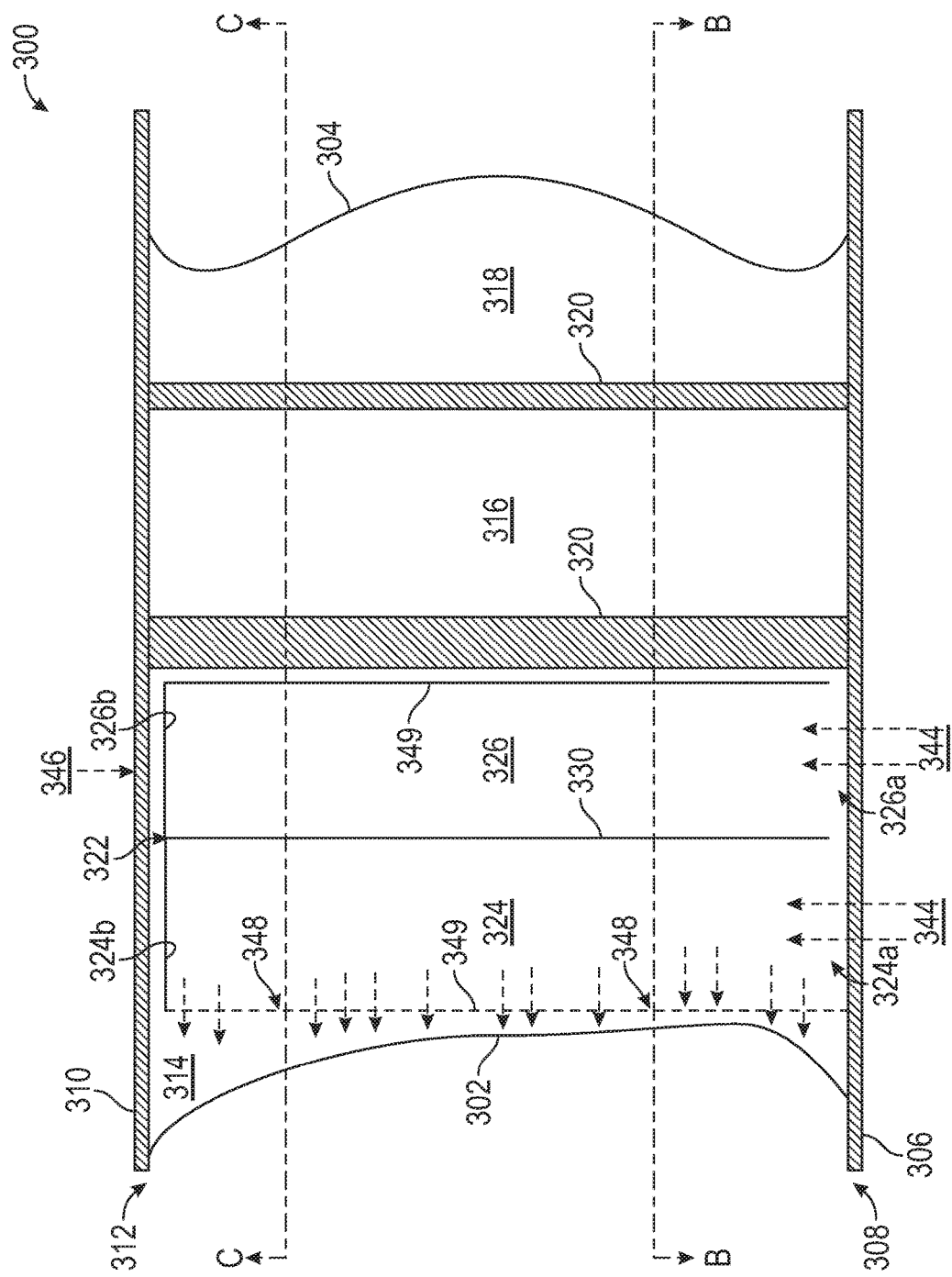
FIG. 3A is an elevation schematic illustration of an airfoil incorporating an embodiment of the present disclosure.
Figure 3B:
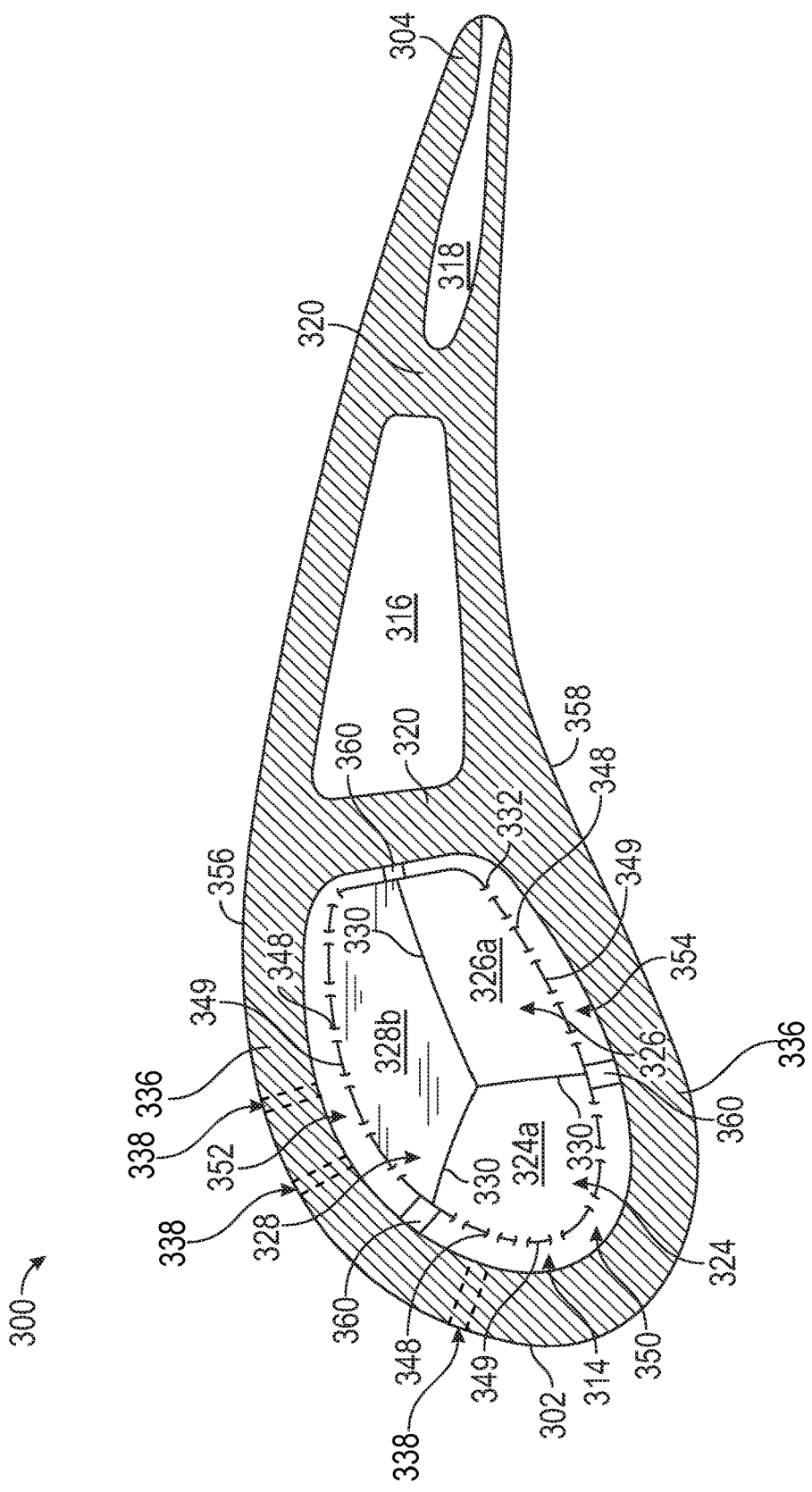
FIG. 3B is a cross-sectional illustration of the airfoil of FIG. 3A as viewed along the line B-B.
Figure 3C:
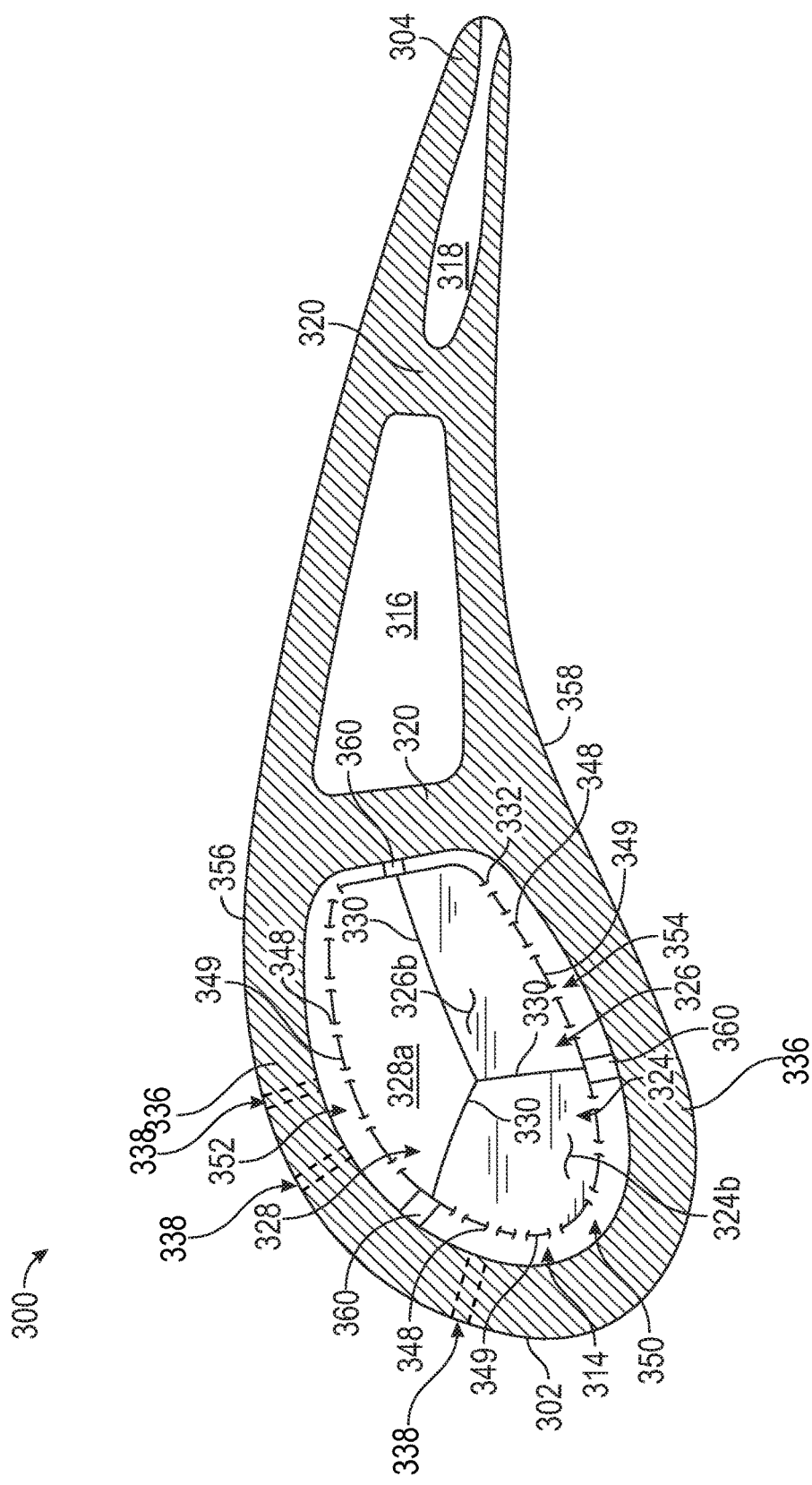
FIG. 3C is a cross-sectional illustration of the airfoil of FIG. 3A as viewed along the line C-C.

Turning now to FIGS. 3A-3C, schematic illustrations of an airfoil 300 in accordance with an embodiment of the present disclosure are shown. The airfoil 300 extends in an axial direction (e.g., as shown in FIG. 2) between a leading edge 302 and a trailing edge 304. In the radial direction, the airfoil 300 extends between an inner platform 306 at an inner diameter 308 and an outer platform 310 at an outer diameter 312. In this illustrative embodiment, the airfoil 300 has three internal cavities: a leading edge cavity 314, a mid-cavity 316, and a trailing edge cavity 318. Although shown with a specific cavity configuration, those of skill in the art will appreciate that airfoils can have a variety of internal cavity configurations and implement embodiment of the present disclosure. Thus the present illustration is merely for explanatory purposes and is not to be limiting. FIG. 3A is a side elevation illustration of the airfoil 300, FIG. 3B is a cross-sectional illustration as viewed along the line B-B, and FIG. 3C is a cross-sectional illustration as viewed along the line C-C.

The cavities 314, 316, 318 are separated by ribs 320. The ribs extend radially between the inner platform 306 at the inner diameter 308 to the outer platform 310 at the outer diameter 312. In this embodiment, the leading edge cavity 314 includes a divided feed baffle 322 installed therein. The divided feed baffle 322 is arranged to enable different cooling sources to provide cooling air within the leading edge cavity 314, as described herein.

As shown in FIGS. 3A-3C, the divided feed baffle 322 includes two or more baffle feed cavities, wherein a direction of cooling flow through at least two of the baffle feed cavities is different. For example, as shown, the divided feed baffle 322 includes a first inner diameter feed cavity 324 (e.g. a leading edge cavity), a second inner diameter feed cavity 326 (e.g., a pressure side cavity), and an outer diameter feed cavity 328 (e.g., a suction side cavity, shown in FIGS. 3B-3C). The various feed cavities 324, 326, 328 of the divided feed baffle 322 are separated by partitions 330. The inner diameter feed cavities 324, 326 include respective inner diameter openings 324a, 324a and outer diameter caps 326b, 326b. The outer diameter feed cavity 328 includes an outer diameter opening 328a and an inner diameter cap 328b. The inner diameter openings 324a, 326a provide fluid communication between the inner diameter feed cavities 324, 326 and the inner diameter platform 306 (and cavities of cooling air associated therewith), thus allowing inner diameter cooling air 344 to flow into the inner diameter feed cavities 324, 326. The outer diameter caps 324b, 326b prevent fluid communication between the outer diameter platform 310 and the inner diameter feed cavities 324, 326, which are supplied cooling air flow from an opening along the inner diameter 306. Conversely, the outer diameter feed cavity 328 is supplied cooling air flow from an opening along an outer diameter opening 328a providing fluid communication between the outer diameter platform 310 (and cavities of cooling air associated therewith), thus allowing outer diameter cooling air 346 into the outer diameter feed cavity 328. The inner diameter cap 328b prevents fluid communication between the inner diameter platform 306 and the outer diameter feed cavity 328.

As such, a first inner diameter feed cavity 324 of the divided feed baffle 322 is defined by partitions 330 in a radial direction and a first outer diameter cap 324b at the outer diameter 312 thereof, with a first inner diameter opening 324a at the inner diameter 308. Similarly, a second inner diameter feed cavity 326 of the divided feed baffle 322 is defined by partitions 330 in a radial direction and a second outer diameter cap 326b at the outer diameter 312 thereof, with a second inner diameter opening 326a at the inner diameter 308. The outer diameter feed cavity 328 of the divided feed baffle 322 is defined by partitions 330 in a radial direction and the inner diameter cap 328a at the inner diameter 308 thereof, with the outer diameter opening 328b at the outer diameter 312.

Each of the baffle feed cavities 324, 326, 328 may include at least one multi-row distributed array and/or at least one row of impingement holes 348 formed within the exterior baffle walls 349 of the divided baffle 322 to allow cooling air from within each of the partitioned baffled feed cavities 324, 326, 328 to impinge upon internal surfaces of the airfoil external hot walls 336 (e.g., as shown, the external walls of the leading edge cavity 314) into which the divided baffle 322 is inserted. For example, as shown, the baffle feed cavities 324, 326, 328 can supply impingement air into a leading edge impingement cavity 350, a suction side impingement cavity 352, and a pressure side impingement cavity 354. The impingement cavities 350, 352, 354 are sub-divided air cavities of the leading edge cavity 314, in which the cooling air flow passes through the divided baffle 322, the impingement holes 348, and then impinges along the internal surfaces of the airfoil external hot walls 336. As shown, the leading edge impingement cavity 350 is a cavity defined between the divided baffle 322 and an interior surface of the airfoil 300 along the leading edge 302. The suction side impingement cavity 352 is a cavity defined between the divided baffle 322 and an interior surface of the airfoil 300 along a suction side 356. The pressure side impingement cavity 354 is a cavity defined between the divided baffle 322 and an interior surface of the airfoil 300 along a pressure side 358.

The impingement cavities 350, 352, 354 are segregated from each other by partial offset rib "standoff" features 360, which function as flow separators. The flow separator rib "standoff" features 360 extend radially within the leading edge cavity 314 along the interior wall surfaces of the airfoil 300 between the interior wall surfaces and the divided baffle 322. The flow separator rib "standoff" features 360 are arranged to prevent cooling air within the different impingement cavities 350, 352, 354 from mixing. Further, the flow separator rib "standoff" features 360 are arranged to provide support and/or to provide positioning control of the divided baffle 322 within the leading edge cavity 314. The flow separator rib "standoff" features 360 may be integrally formed using conventional manufacturing processes. Alternatively, the flow separator rib "standoff" features 360 of the divided baffle 322 may be directly fabricated as continuous radial offset features using advanced additive manufacturing methods. Similarly, the flow separator rib "standoff" features may be may be integrally formed during an investment casting process as part of the airfoil. In yet another embodiment, the flow separator rib "standoff" features may be separate structures inserted into and/or fixed to one or both of the divided baffle 322 and/or the airfoil 300. In some embodiments, a leakage flow can exist between the impingement cavities 350, 352, 354, as contact or a sealing between the divided baffle 322, the flow separator rib "standoff" features 360, and the interior surfaces of walls of the airfoil 300 may not be perfect.

Those skilled in the art will understand that the flow separator rib "standoff" features of the present disclosure can take various geometric and/or structural shapes. For example, the flow separator rib "standoff" features may be linear and/or curvilinear in nature as they extend along a predominantly radial and/or axial orientation. It is to be understood that the shape, size, width, and height of the flow separator rib "standoff" features may vary in order to tailor an impingement distance and/or cross-sectional area and dimensional size of each of the formed impingement cavities in order to optimize internal convective heat transfer and pressure loss characteristics.

In some embodiments, and as shown in FIGS. 3B-3C, one or more of the impingement cavities 350, 352, 354 can be arranged to expel air out along the external hot walls 336 of the airfoil. Accordingly, one or more film cooling holes 338 can be arrange to emanate through the external hot wall 336 of the airfoil 300. As such, various cooling schemes and designs can be arranged for different locations of the airfoil. For example, as shown, the suction side impingement cavity 352 and the leading edge impingement cavity 350 are arranged with different arrangements of film cooling holes 338. The air that impinges into the suction side impingement cavity 352 and the leading edge impingement cavity 350 may be expelled through the film cooling holes 338 and form a film along the exterior surface of the airfoil 300. In contrast, the pressure side impingement cavity 354 of the present embodiment does not include any film cooling holes. As such, in this embodiment the pressure side impingement cavity 354 is cooled through convention only, and no film cooling is provided. Those of skill in the art will appreciate that other arrangements and orientations of film cooling holes can be employed without departing from the scope of the present disclosure.

Moreover, as will be appreciated by those of skill in the art, various heat transfer augmentation features, such as trip strip geometric features, can be incorporated along the internal surface of the hot exterior airfoil wall. That is, the surfaces of the airfoil that will be impinged upon by the air flowing through the impingement holes may include one or more heat transfer augmentation features. In various embodiments of the present disclose, the heat transfer augmentation features may consist of normal, skewed, segmented skewed, chevron, discrete chevron, W-shaped, discrete w-shaped, etc. trip strip features. Alternatively, or in combination therewith, cylindrical pin fin and/or spherical shaped dimple features can also be utilized either independently and/or in conjunction with trip strip (turbulators) features in order to tailor and enhance internal convective heat transfer and pressure loss characteristics where necessary.

Figure 4:
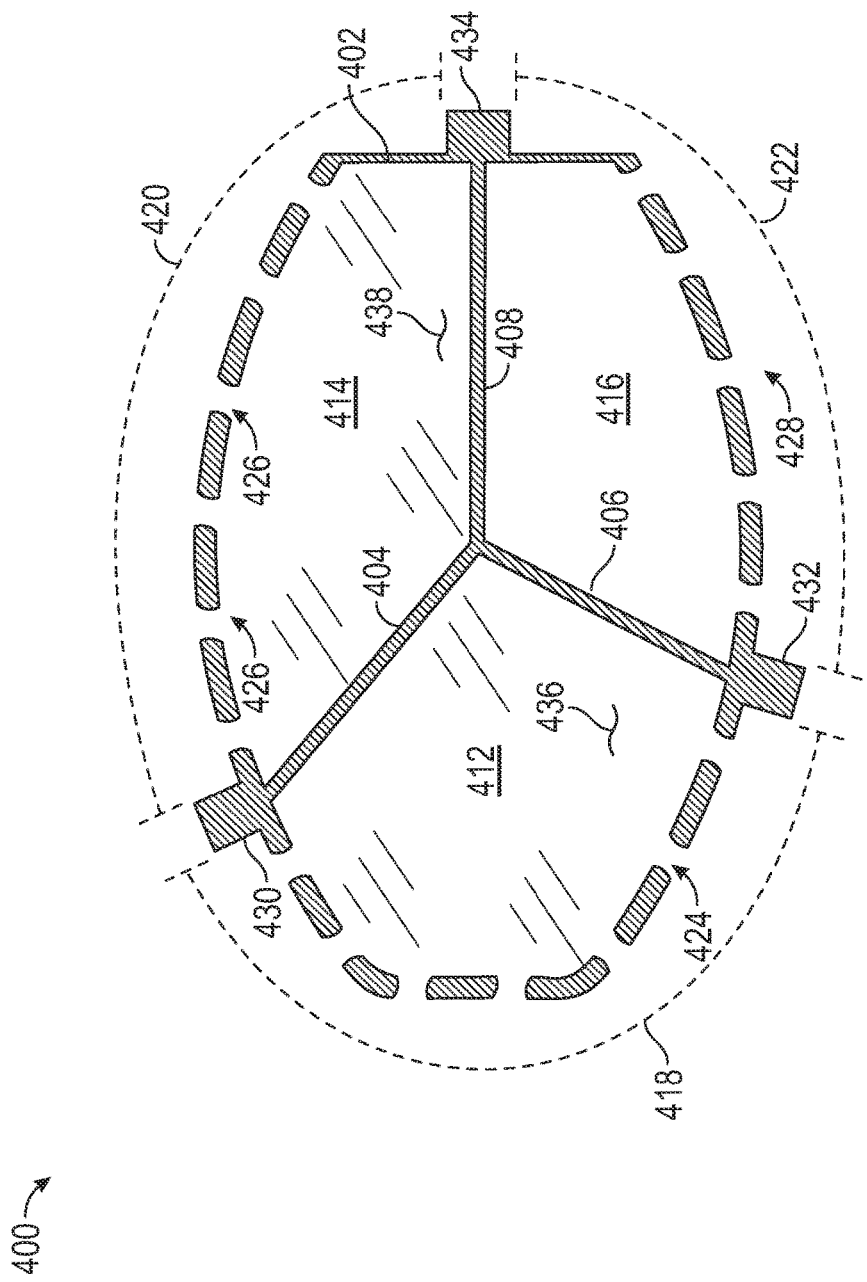
FIG. 4 is a schematic illustration of a divided baffle in accordance with an embodiment of the present disclosure.

Turning now to FIG. 4, a schematic illustration of a divided baffle 400 in accordance with an embodiment of the present disclosure is shown. The divided baffle 400 is similar to the divided baffle shown and described above. As shown, the divided baffle 400 includes a baffle body 402 that includes interior dividers 404, 406, 408. The dividers divide the interior of the baffle body 402 into feed cavities 412, 414, 416. As shown, a first feed cavity 412 is formed as a leading edge feed cavity within the baffle body 402 and is defined by a first portion 418 of the baffle body 402, a first divider 404, and a second divider 406. A second feed cavity 414 is formed as a suction side feed cavity within the baffle body 402 and is defined by a second portion 420 of the baffle body 402, the first divider 404, and a third divider 408. A third feed cavity 416 is formed as a pressure side feed cavity within the baffle body 402 and is defined by a third portion 422 of the baffle body 402, the second divider 406, and the third divider 408.

The feed cavities 412, 414, 416 can include caps located at one end thereof to form inner or outer diameter feed cavities, as shown and described with respect to FIGS. 3A-3C. For example, the first and second feed cavities 412, 414 can include outer diameter caps which bound an end of the baffle body 402 to form inner diameter feed cavities. Further, the third feed cavity 416 can include an inner diameter cap which bounds an end of the baffle body 402 at the opposite end from the end bounding the first and second feed cavities 412, 414, to thus form an outer diameter feed cavity. Accordingly, the divided baffle 400 can provide counter cooling flows between one or more of the different feed cavities. Each portion 418, 420, 422 is a portion or section of a wall of the baffle body 402 of the divided baffle, with the portions 418, 420, 422 extending in, predominantly, a radial direction when installed within an airfoil of a gas turbine engine (e.g., into and out of the page).

As shown, the baffle body 402 includes impingement holes 424, 426, 428 that enable fluid flow therethrough from the feed cavities 412, 414, 416 and into an airfoil cavity (e.g., impingement cavity of an airfoil). First impingement holes 424 are formed in the baffle body 402 on the first portion 418, second impingement holes 426 are formed in the baffle body 402 on the second portion 420, and third impingement holes 428 are formed in the baffle body 402 on the third portion 418. The impingement holes 424, 426, 428 can be provided in various arrangements and/or patterns and can be located along the radial extent of the baffle body 402.

Also shown are flow separator rib "standoff" features 430, 432, 434. The flow separators 430, 432, 434, as shown, are attached to an exterior surface of the baffle body 402 and define the portions 418, 420, 422 of the divided baffle 400. That is, the first portion 418 of the baffle body 402 is defined as a portion of the baffle body 402 located between a first flow separator 430 and a second flow separator 432. The second portion 420 is defined as a portion of the baffle body 402 located between the first flow separator 430 and a third flow separator 434. The third portion 422 is defined as a portion of the baffle body 402 located between the second flow separator 432 and the third flow separator 434. As noted above, the flow separators 430, 432, 434 are arranged to fluidly separate different portions or sections of an airfoil cavity (e.g., impingement cavities). Further, as noted above, the flow separators 430, 432, 434 can be used to position, retain, or otherwise support the baffle body 402 within an airfoil cavity. The flow separators 430, 432, 434 may be integrally formed with the baffle body 402, can be fixedly attached to the baffle body 402, can be position between the baffle body 402 and a wall of an airfoil cavity, or can be integrally formed with, part of, or attached to an airfoil cavity wall, as described above.

As shown in FIG. 4, the divided baffle 400 includes a first cap 436 and a second cap 438. The first cap 436 and the second cap 438 are located at a first end of the baffle body 402 and block or prevent fluid flow into the first and second feed cavities 412, 414, respectively. Although not show, the baffle body 402 includes a third cap at a second end opposite the first end and bounds the third feed cavity 416 at the second end. Thus, the feed cavities 412, 414, 416 will have a configuration similar to that shown and described with respect to FIGS. 3A-3C, although other arrangements are possible without departing from the scope of the present disclosure.

Those of skill in the art will appreciate that the divided baffles disclosed here may be created by traditional means or via additive manufacturing, and subsequently installed into an airfoil cavity. Although shown and described with respect to installation within a leading edge cavity of a first set of vanes downstream of a combustor (i.e., first stage vane), such description is not to be limiting. For example, divided baffles as described herein can be installed in any interior cavity of an airfoil to provide cooling as described herein. Further, any vane of a gas turbine engine can employ such divided baffles, and installation into a first vane downstream of a combustor is not necessary.

Further, although the disclosed example embodiment shows a separate leading edge impingement cavity and suction side impingement cavity, those of skill in the art will appreciate that the flow separator separating these cavities may be eliminated. Similarly, although a divider is shown separating the first inner diameter feed cavity 324 and the second inner diameter feed cavity 326, such divider is optional, and is not required.

Advantageously, embodiments provided herein enable improved back flow margin by sourcing leading edge air from two feeds (e.g., a portion from the outer diameter platform and a portion from the inner diameter platform). As such, the divided baffles of the present disclosure enable segregation of 'clean' supply air to airfoil locations with a high propensity of hole-plugging. Moreover, segregation of sections of the airfoil with different external dump pressures can be achieved, thus allowing for better management of pressure drop and improved back flow margin.

Although the various above embodiments are shown as separate illustrations, those of skill in the art will appreciate that the various features can be combined, mix, and matched to form an airfoil having a desired cooling scheme that is enabled by one or more features described herein. Thus, the above described embodiments are not intended to be distinct arrangements and structures of airfoils and/or core structures, but rather are provided as separate embodiments for clarity and ease of explanation.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A divided baffle for a gas turbine engine, the divided baffle comprising:
    a baffle body having a first end and a second end;
    at least one divider located within the baffle body and extending from the first end to the second end arranged to divide an interior of the baffle body into two or more feed cavities;
    at least one cap arranged at the first end to bound a first feed cavity of the two or more feed cavities; and
    at least one cap arranged at the second end to bound a second feed cavity of the two or more feed cavities.

2. The divided baffle of claim 1, wherein the first feed cavity is defined between the at least one divider and a first portion of the baffle body and the second feed cavity is defined between the at least one divider and a second portion of the baffle body, wherein each of the first portion and the second portion include one or more impingement holes.

3. The divided baffle of claim 1, further comprising at least one flow separator located on an external surface of the baffle body, wherein the at least one flow separator is arranged to at least one of position and support the baffle body within an airfoil cavity.

4. The divided baffle of claim 1, wherein the at least one divider includes a first divider, a second divider, and a third divider, wherein:
the first feed cavity is defined between a first portion of the baffle body, the first divider, the second divider, and a first cap located at the first end;
the second feed cavity is defined between a second portion of the baffle body, the first divider, the third divider, and a second cap located at the second end; and
a third feed cavity defined between a third portion of the baffle body, the second divider, the third divider, and a third cap located at the first end.

5. A component for a gas turbine engine, the component comprising:
an airfoil having a leading edge, a trailing edge, a suction side, and a pressure side, wherein an airfoil cavity is formed within the airfoil, wherein the airfoil extends from an inner diameter to an outer diameter; and
a divided baffle installed within the airfoil cavity, the divided baffle comprising:
a baffle body having a first end and a second end, wherein the first end is located proximate the inner diameter and the second end is located proximate the outer diameter;
at least one divider located within the baffle body and extending from the first end to the second end arranged to divide an interior of the baffle body into two or more feed cavities;
at least one cap arranged at the first end to bound a first feed cavity of the two or more feed cavities; and
at least one cap arranged at the second end to bound a second feed cavity of the two or more feed cavities.

6. The component of claim 5, wherein the first feed cavity is defined between the at least one divider and a first portion of the baffle body and the second feed cavity is defined between the at least one divider and a second portion of the baffle body, wherein each of the first portion and the second portion include one or more impingement holes.

7. The component of claim 5, further comprising at least one flow separator located on an external surface of the baffle body, wherein the at least one flow separator is arranged to at least one of position and support the baffle body within the airfoil cavity.

8. The component of claim 7, wherein the at least one flow separator is integrally formed with the baffle body.

9. The component of claim 7, wherein the at least one flow separator is integrally formed with the airfoil.

10. The component of claim 5, wherein the at least one divider includes a first divider, a second divider, and a third divider, wherein:
the first feed cavity is defined between a first portion of the baffle body, the first divider, the second divider, and a first cap located at the first end;
the second feed cavity is defined between a second portion of the baffle body, the first divider, the third divider, and a second cap located at the second end; and
a third feed cavity defined between a third portion of the baffle body, the second divider, the third divider, and a third cap located at the first end.

11. The component of claim 5, wherein the airfoil cavity is divided into at least two impingement cavities, wherein the impingement cavities are defined between the baffle body and an interior surface of the airfoil that defines the airfoil cavity.

12. The component of claim 5, wherein the airfoil is a vane of a gas turbine engine.

13. The component of claim 5, wherein the airfoil cavity is a leading edge cavity of the airfoil.

14. A gas turbine engine comprising:
an airfoil having a leading edge, a trailing edge, a suction side, and a pressure side, wherein an airfoil cavity is formed within the airfoil, wherein the airfoil extends from an inner diameter to an outer diameter; and
a divided baffle installed within the airfoil cavity, the divided baffle comprising:
a baffle body having a first end and a second end, wherein the first end is located proximate the inner diameter and the second end is located proximate the outer diameter;
at least one divider located within the baffle body and extending from the first end to the second end arranged to divide an interior of the baffle body into two or more feed cavities;
at least one cap arranged at the first end to bound a first feed cavity of the two or more feed cavities; and
at least one cap arranged at the second end to bound a second feed cavity of the two or more feed cavities.

15. The gas turbine engine of claim 14, wherein the airfoil is a vane of a gas turbine engine.

16. The gas turbine engine of claim 14, wherein the airfoil cavity is a leading edge cavity of the airfoil.

17. The gas turbine engine of claim 14, wherein the airfoil extends between a first platform and a second platform.

18. The gas turbine engine of claim 17, wherein the first feed cavity is fluidly connected to the first platform and the second feed cavity is fluidly connected to the second platform.

19. The gas turbine engine of claim 18, wherein the cap at the first end prevents airflow from the second platform from entering the first feed cavity and the cap at the second end prevents airflow from the first platform from entering the second feed cavity.

20. The gas turbine engine of claim 14, wherein the first feed cavity is supplied with cooling air from an inner diameter of the airfoil and the second feed cavity is supplied with cooling air from an outer diameter of the airfoil such that airflow within the first feed cavity flows in a different direction than airflow within the second feed cavity.

* * * * *